United States Patent [19]

Brousse

[11] 3,994,860

[45] Nov. 30, 1976

[54] PROCESS FOR IMPROVING THE SHRINKAGE RESISTANCE UPON-DRYING MEMBRANES OF SULPHONATED POLYARYL ETHER BY IMMERSING THE MEMBRANE IN AN AQUEOUS SOLUTION OF AN INORGANIC SALT OF A CARBONYLATED OR HYDROXYLATED LOWER CARBOXYLIC ACID

[75] Inventor: Claude Brousse, Irigny, France

[73] Assignee: Rhone-Poulenc Industries, Paris, France

[22] Filed: Apr. 2, 1975

[21] Appl. No.: 564,360

[30] Foreign Application Priority Data

Apr. 3, 1974 France ............................ 74.11767

[52] U.S. Cl. .............................. 260/49; 210/321 R; 260/2.2 R; 260/47 R; 260/79.3 R; 526/56; 210/321

[51] Int. Cl.² .......................................... C09G 1/04

[58] Field of Search ......... 260/2.2 R, 2.1 R, 79.3 R, 260/49, 47 R

[56] References Cited

UNITED STATES PATENTS

| | | | |
|---|---|---|---|
| 3,709,841 | 1/1973 | Quentin ........................... | 260/2.2 R |
| 3,717,594 | 2/1973 | Ryan ................................ | 260/2.2 R |
| 3,855,122 | 12/1974 | Bowrganel ....................... | 260/2.2 R |
| 3,856,556 | 1/1973 | Quentin ........................... | 260/2.2 R |
| 3,875,096 | 4/1975 | Graefe et al. ..................... | 260/49 |

*Primary Examiner*—Joseph L. Schofer
*Assistant Examiner*—Peter F. Kulkosky
*Attorney, Agent, or Firm*—Stevens, Davis, Miller & Mosher

[57] ABSTRACT

Sulphonated polyaryl ether membranes are rendered less susceptible to shrinkage during drying by immersing the membrane in a solution of an inorganic salt of a hydroxylated or carbonylated lower carboxylic acid.

6 Claims, No Drawings

PROCESS FOR IMPROVING THE SHRINKAGE RESISTANCE UPON-DRYING MEMBRANES OF SULPHONATED POLYARYL ETHER BY IMMERSING THE MEMBRANE IN AN AQUEOUS SOLUTION OF AN INORGANIC SALT OF A CARBONYLATED OR HYDROXYLATED LOWER CARBOXYLIC ACID

This invention relates to a process for treating a sulphonated polyaryl ether membrane, particularly for reverse osmosis or ultra-filtration.

Membranes suitable for reverse osmosis or ultrafiltration which are made from sulphonated polyethers, especially from sulphonated polyaryl ether sulphones are known [see, for example, U.S. Pat. No. 3,709,841 and French Pat. Nos. 2,138,333 and 2,138,334].

The sulphonated polyaryl ether/sulphones used for this purpose are generally polymers which comprise a plurality of units of the formula:

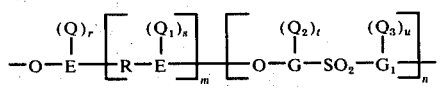

and, optionally, units of the formula:

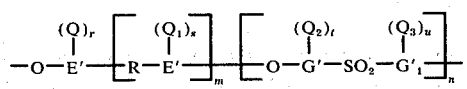

in which:
each of E, G and $G_1$, which may be identical or different, is an aromatic group, at least one of which is substituted by one or more sulphonic acid groups, it being possible for the number of sulphonic acid groups per aromatic group to vary from one unit to another,
each of E', G' and $G'_1$, which may be identical or different, are as defined under E, G and $G_1$ except that they do not contain sulphonic acid groups,
each of Q and $Q_1$, which may be identical or different, represents a substitutent which is inert to sulphonation reactions, such as alkyl radicals with 1 to 4 carbon atoms, and halogen atoms, in particular fluorine, chlorine, bromine and iodine,
each of $Q_2$ and $Q_3$, which may be identical or different, represents an electron-attracting group such as a nitro, phenylsulphone, alkylsulphone, trifluoromethyl, nitroso or pyridyl group,
each of r, s, t and u, which may be identical or different, is 0 or an integer from 1 to 4, at least one of which is less than 4,
each of m and n, which may be identical or different, is 0 or 1, and
R represents a valency bond or a radical which is —CO—, —O— or —$SO_2$— or a divalent organic hydrocarbon radical such as alkylene, alkylidene, cycloalkylene and arylene radicals, these radicals having preferably less than 7 carbon atoms.

The sulphonated polyaryl ether/sulphones described in U.S. Pat. No. 3,709,841 generally possess from 0.1 to 5 milliequivalents of sulphonic acid groups per gram (meq/g) of dry polymer.

These sulphonated polymers can be prepared by sulphonation (in known manner) of polyaryl ether/sulphones comprising a plurality of units of formula (II). The latter polymers can be prepared in accordance with the technique described in, for example, French Pat. No. 1,407,301.

It is also known (see the abovementioned United States patent) that membranes made from sulphonated polyaryl ether/sulphones are particularly useful for the fractionation of the various constituents of solutions by direct or reverse osmosis.

Asymmetric membranes made from sulphonated polyaryl ether/sulphones, prepared especially by casting a solution of polymer and then coagulating one of the faces of the film impregnated with solvent thus obtained, have also been described in the abovementioned United States patent. Such membranes possess a thin dense layer forming the active layer of the membrane, with a porous strengthening support layer.

A process for the preparation of symmetric semipermeable membranes made from sulphonated polyaryl ether/sulphones, which can be used for fractionating the various constituents of a solution, especially by direct or reverse osmosis or by ultrafiltration, and which makes it possible to produce membranes which possess particularly advantgeous properties, in particular as regards their degree of rejection and flow rate, has been described in French Pat. No. 2,138,333. This process consists of forming a solution of a sulphonated polyaryl ether/sulphone, forming a film by casting this solution, immersing the supported film in a coagulation bath and then recovering the membrane thus produced. This process is characterised in that:
a. the sulphonated polyaryl ether/sulphone used possesses 0.1 to 2 meq/g of sulphonic acid groups and a reduced specific viscosity of 40 to 200 $cm^3$/g (measured using a 2 g/l solution in dimethylformamide [DMF] at 25° C),
b. the concentration of the solution for casting is from 5 to 60% (expressed in g of polymer per $cm^3$ of solution),
c. the coagulation bath consists of water,
d. the temperature of the coagulation bath is 0° C to 100° C,
e. the duration of immersion in the coagulation bath is from 30 seconds to 60 minutes,
f. the immersion of the film in the coagulation bath is preceded by gelling this film, and
g. the solution of polymer and/or the coagulation bath contains 0.1 to 10% by weight of an amine salt or a quaternary ammonium salt which is soluble in water and in the solution of polymer.

This process is applicable to the various types of sulphonated polyaryl ether/sulphones containing units of formula I (and optionally II), it being understood that the expression "sulphonic acid" denotes a group of the formula
$-SO_3^-.1/n\ M^{n+}$,
M denoting a hydrogen ion or an alkali metal or alkaline earth metal ion and n being 1 or 2.

Another process for the preparation of asymmetric semi-permeable membranes made from sulphonated polyaryl ether/sulphones has been described in French Pat. No. 2,138,334. This process consists of forming a solution of sulphonated polyaryl ether/sulphone, forming a film by casting the solution, immersing the support coated with the layer of polymer in a coagulating bath and then recovering the membrane, and it is characterised in that:

a. the sulphonated polyaryl ether/sulphone used possesses 0.3 to 2 meq/g of sulphonic acid groups and a reduced specific viscosity (measured as a 2 g/l solution of concentration in DMF at 25° C,) of 40 to 200 cm³/g,
b. the concentration of the solution for casting is 5 to 60% (expressed in g of polymer per cm³ of solution),
c. the coagulating bath comprises, per 100 parts by weight of water, 5 to 100 parts of a salt formed from an anion of a strong inorganic acid and a metal cation and 1 to 120 parts of a solvent for the polymer.
d. the temperature of the coagulation bath is from −30° to +30° C,
e. the period of time for which the film is left in the coagulation bath is from 30 seconds to 60 minutes, and
f. the immersion of the film in the coagulation bath is preceded by gelling the film.

The membranes thus prepared, either in accordance with French Pat. No. 2,138,333 or in accordance with French Pat. No. 2,138,334, can then undergo additional treatments, especially heat treatments in water or aqueous saline solution, which, by tightening the structure of the said membranes, makes them more suitable for reverse osmosis.

The aim of the invention is to produce membranes made from sulphonated polyaryl ethers, more especially membranes for reverse osmosis made from sulphonated polyaryl ether/sulphones which, during drying, undergo only a small amount of dimensional shrinkage which prevents, or at least reduces, the danger of tearing when such membranes are dried after having been assembled in apparatuses.

It has been found, according to this invention, that this can be achieved by treating the membrane made from sulphonated polyaryl ether/sulphones by immersion in a solution of an inorganic (including ammonium [$NH_4^+$]) salt of a lower carboxylic acid carrying hydroxyl or carbonyl groups.

The salts which can be used in the process of this invention are preferably sodium or potassium salts, are preferably salts which have a solubility in water of at least 15% by weight. The membranes are suitably immersed in aqueous solutions containing at least 10%, preferably at least 15% by weight up to the saturation concentration of the salt.

The lower carboxylic acids carrying hydroxyl or carbonyl groups are mono- or poly-carboxylic acids which generally possess at most 10 carbon atoms and are generally devoid of ethylenic double bonds; carbon atoms which do not form part of the carboxylic acid groups carry a carbonyl group or one or two hydroxyl groups. Lactic, citric, gluconic and tartaric acids, which are especially advantageous in numerous applications of the membranes because they are acceptable from the alimentary point of view, and 2-hydroxyisobutyric, mandelic, glycollic, glyoxylic and malic acids may be mentioned as typical such carboxylic acids.

The duration of immersion in the salt solution acids is usually at least 30 seconds and preferably at least 2 minutes; there is no critical upper limit but it is generally of no value to prolong the immersion beyond 10 hours.

Once the immersion is complete, the membrane treated according to this invention can be dried in the ordinary way, for example simply by leaving it exposed to the atmosphere.

Of course, sulphonated polyethers other than sulphonated polyaryl ether/sulphones can be used in the invention; it is possible to treat membranes made from sulphonated polyarylene ethers in general.

The following Examples further illustrate the present invention. In these Examples, the membrane which is treated is a membrane made from a sulphonated polyaryl ether/sulphone (recurring unit [$—C_6H_4—C(CH_3)_2—C_6H_4—O—C_6H_4—SO_2—C_6H_4—O—$]), prepared in accordance with French Pat. No. 2,138,333, and which, when used in reverse osmosis to treat a 5 g/l aqueous NaCl solution, under 30 bars at 20° C, possesses a degree of rejection of 95% for a flow rate of 500 l/day.m².

The various membranes treated by means of the aqueous salt solutions (immersion for 4 hours at 20° C) are dried in air (removal of the drops of solutions which remain by simple contact with a sheet of filter paper, that is to say adsorbent paper, followed by drying by exposure to the atmosphere for 2 hours at 20° C) optionally followed by drying in vacuo (30 minutes at 25° C under an absolute pressure of 40 mm Hg).

After each of the drying operations, and without wetting again, the shrinkage shown by the membranes is measured.

The results obtained in the various Examples are given in the table below. The concentrations of solutions, expressed as a percentage, are concentrations in per cent by weight.

| Example | Nature of the treatment salt | Concentration of the treatment solution | Shrinkage in % after drying in air | Shrinkage in % after supplementary drying in vacuo |
|---|---|---|---|---|
| 1 | Potassium lactate | 35 % | 1.4 | 1.4 |
| 1 bis (comparative) | None | 0 | 11 | 11 |
| 2 | Sodium lactate | 35 % | | 1 |
| 3 | Sodium tartrate | Saturation | 3.4 | 3.9 |
| 4 | Sodium malate | 35 % | 1.4 | 2.7 |
| 5 | Sodium citrate | 35 % | 0.7 | 2 |
| 6 | Sodium glycollate | 35 % | 1.4 | 3 |
| 7 | Sodium gluconate | 35 % | 2 | 2.4 |
| 8 | Sodium glyoxylate | Saturation | 2.7 | 3.7 |
| 9 | Sodium mandelate | Saturation | 1.4 | 1.4 |

We claim:

1. Process for treating a sulphonated polyaryl ether membrane which comprises immersing the membrane in an aqueous solution containing from 10% by weight to the saturation concentration of an inorganic salt which is soluble in water to an extent of at least 15% by weight of a hydroxylated or carbonylated lower carboxylic acid.

2. Process according to claim 1, in which the inorganic salt is a sodium or potassium salt.

3. Process according to claim 1, in which the lower carboxylic acid possesses at most 10 carbon atoms and is devoid of ethylenic double bonds.

4. Process according to claim 3, in which the carboxylic acid is lactic or citric acid.

5. Process according to claim 3, in which the carboxylic acid is selected from 2-hydroxy-isobutyric, gluconic, glycollic, glyoxylic, malic, mandelic and tartaric acid.

6. Process according to claim 3, in which the sulphonated polyaryl ether is a sulphonated polyaryl ether/sulphone.

* * * * *